United States Patent
Duchet et al.

(10) Patent No.: US 11,209,104 B2
(45) Date of Patent: Dec. 28, 2021

(54) FASTENING SYSTEM FOR A PIPE PASSING THROUGH A PANEL OF AN AIR HANDLING UNIT, AND AIR HANDLING UNIT COMPRISING SUCH A SYSTEM

(71) Applicant: Carrier Corporation, Palm Beach Gardens, FL (US)

(72) Inventors: Samuel Duchet, Lyons (FR); Marc Serra, Andert et Condon (FR); Thomas Carton, Eloise (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 474 days.

(21) Appl. No.: 16/080,873

(22) PCT Filed: Mar. 2, 2016

(86) PCT No.: PCT/IB2016/000353
§ 371 (c)(1),
(2) Date: Aug. 29, 2018

(87) PCT Pub. No.: WO2017/149337
PCT Pub. Date: Sep. 8, 2017

(65) Prior Publication Data
US 2019/0086005 A1     Mar. 21, 2019

(51) Int. Cl.
*F16L 5/10* (2006.01)
*F24F 13/20* (2006.01)
*F24F 13/02* (2006.01)

(52) U.S. Cl.
CPC ............ *F16L 5/10* (2013.01); *F24F 13/0209* (2013.01); *F24F 13/20* (2013.01)

(58) Field of Classification Search
CPC .. F16L 5/10; F16L 41/088; F24F 13/20; F24F 13/0209
(Continued)

(56) References Cited

U.S. PATENT DOCUMENTS 3,866,950 A     2/1975   Skoch et al.
4,086,736 A *   5/1978   Landrigan ................. F16L 5/04
                                                              248/56
(Continued)

FOREIGN PATENT DOCUMENTS

CA     2452668 A1     3/2005
CN     2450490 Y      9/2001
(Continued)

OTHER PUBLICATIONS

International Search Report adn Written Opinion for application PCT/IN2016/000353, dated Nov. 9, 2016, 10 pages.
(Continued)

*Primary Examiner* — James M Hewitt, II
(74) *Attorney, Agent, or Firm* — Cantor Colburn LLP (57) ABSTRACT

A fastening system for a pipe passing through an insulating side panel of an air handling unit. The panel includes two parallel walls separated by a layer of insulating material, a hole provided through the walls and a layer of insulating material for passing the pipe. The fastening system includes two bellows fixed on each of the parallel walls of the pane around the hole. Each bellow includes a frame fixed on one of the walls and a deformable portion fixed to the frame. The deformable portion includes a wide portion which connects the deformable portion to the frame, and a narrow portion fitted around the pipe.

12 Claims, 7 Drawing Sheets

(58) Field of Classification Search
USPC .......................................................... 285/205
See application file for complete search history.

(56) References Cited

U.S. PATENT DOCUMENTS

| | | | |
|---|---|---|---|
| 4,120,129 A | 10/1978 | Nagler et al. | |
| 4,211,423 A | 7/1980 | Resech | |
| 4,333,660 A | 6/1982 | Cupit | |
| 5,027,665 A | 7/1991 | Hayward | |
| 5,109,756 A | 5/1992 | Barboza et al. | |
| 5,222,334 A | 6/1993 | Hasty | |
| 5,316,405 A | 5/1994 | Atanasoski et al. | |
| 5,588,267 A | 12/1996 | Rodriguez et al. | |
| 5,765,837 A | 6/1998 | Schwärzler | |
| 5,826,919 A | 10/1998 | Bravo et al. | |
| 6,086,117 A * | 7/2000 | Youngs ................ | F16L 5/08 277/606 |
| 6,306,046 B1 | 10/2001 | Didszuhn | |
| 6,353,184 B1 | 3/2002 | Daoud | |
| 6,361,444 B1 | 3/2002 | Cheney et al. | |
| 6,362,427 B1 | 3/2002 | Daoud | |
| 6,739,596 B2 | 5/2004 | Matczak et al. | |
| 6,752,176 B1 | 6/2004 | Price et al. | |
| 7,357,725 B2 | 4/2008 | Sueoka et al. | |
| D585,968 S | 2/2009 | Elkins et al. | |
| 7,708,286 B2 * | 5/2010 | Henry ................ | F16L 5/08 277/607 |
| 7,790,989 B2 | 9/2010 | Delakowitz | |
| 7,814,709 B1 | 10/2010 | Resech | |
| 8,112,866 B2 | 2/2012 | Villalobos | |
| 8,453,389 B2 | 6/2013 | Selke et al. | |
| 8,479,455 B2 | 7/2013 | Schaefer et al. | |
| 8,608,206 B2 | 12/2013 | Fedale, Sr. et al. | |
| 9,068,673 B2 | 6/2015 | Mukai et al. | |
| 9,206,928 B2 | 12/2015 | Haynes et al. | |
| 2006/0163821 A1 * | 7/2006 | Henry ................ | F16L 5/10 277/604 |
| 2008/0007046 A1 | 1/2008 | Barboza et al. | |
| 2014/0299369 A1 | 10/2014 | Andresen et al. | |
| 2016/0010768 A1 | 1/2016 | Haynes | |

FOREIGN PATENT DOCUMENTS

| | | |
|---|---|---|
| CN | 101351665 A | 1/2009 |
| CN | 204986040 U | 1/2016 |
| DE | 102007058159 A1 | 6/2008 |
| EP | 1089411 A1 | 4/2001 |
| EP | 1582648 A1 | 10/2005 |
| EP | 2169289 A1 | 3/2010 |
| GB | 2264165 A | 8/1993 |

OTHER PUBLICATIONS

Vicwest Building Products, "Flashings / Trims / Closures / Vents", available at: https://vicwest.com/products/commercial/accessories/comm-flashings-trims-closures-vents/flashingstrimsclosuresvents/, accessed: Aug. 28, 2018, 6 pages.

Chinese Office Action for application CN 201680083000.X dated Mar. 19, 2020, 8 pages.

* cited by examiner

FASTENING SYSTEM FOR A PIPE PASSING THROUGH A PANEL OF AN AIR HANDLING UNIT, AND AIR HANDLING UNIT COMPRISING SUCH A SYSTEM

The invention concerns a fastening system for a pipe passing through a panel of an air handling unit. The invention also relates to an air handling unit comprising such a fastening system.

It is known to implement air handling units on buildings, especially office buildings or supermarkets, for treating the air inside the building. Such air handling units usually have inlet and outlet openings, for the air to be circulated through the unit, and a plurality of components, each relative to a function for treating the air, such as circulating, filtering, depolluting, humidifying, drying, heating, cooling, or the like. These components are enclosed inside a structural frame, supporting a housing made of flat insulating panels, forming a protective thermal barrier of the air handling unit. Each panel comprises an insulating core material, generally a glass wool, interposed between two metallic walls.

Some components of the air handling unit, such as heat exchangers, which are provided to heat or cool down the air circulating in the unit, are constantly fed with a heat transfer fluid, generally water, which is circulated at a given temperature through the insulating panels of the unit and towards heat exchangers. The heat exchangers are equipped with inlet and outlet pipes, which protrude through the insulating panels towards the outside of the unit, so that they can be connected to cold water or hot water production systems. The protrusion of the pipes through the insulating panels implies tightness issues which are currently solved by mounting a foam spacer between the two metallic walls of the insulating panels; the foam being provided with a hole through which passes the pipe. This technique guarantees poor air tightness, and does not provide satisfying positioning tolerances, when a cold or hot water production system must be connected to the pipes.

The aim of the invention is to provide a new fastening system for a pipe passing through a panel, which provides better tightness and better manufacturing tolerances than the systems of the prior art.

To this end, the invention concerns a fastening system for a pipe passing through an insulating side panel of an air handling unit, said panel comprising two parallel walls separated by a layer of insulating material, and a hole provided through the walls and the layer of insulating material for passing the pipe. This fastening system is characterized in that it comprises two bellows fixed on each of the parallel walls of the panel around the hole, each bellow comprising a frame fixed on one of the walls and a deformable portion fixed to the frame, comprising a wide portion which connects the deformable portion to the frame, and a narrow portion fitted around the pipe.

Thanks to the invention, the bellows attached to the pipe and to the walls of the panels provide an improved air tightness, and the flexibility of the bellows allow a larger positioning tolerance, which prevents subsequent disassembly between the pipe and a cold or hot water production system.

According to further aspects of the invention, such a fastening system may incorporate one or several of the following features:

The deformable portion of each bellow comprises a sealing lip which contacts the wall against which the bellow is fixed.

The sealing lip defines a continuous sealing around the hole provided on the panel.

The frame exerts a force on the deformable portion which tends to compress the sealing lip against the wall.

The deformable portion of the bellows is made of a plastic material.

The deformable portion of the bellows is made of PA6 with glass fibers.

The bellows are fixed on the walls by screws which pass through the frame and through holes of a radial flat portion of the deformable portion.

The deformable portion of the bellows comprises concentric sections adapted to be cut according to several different diameters of pipes, the respective diameters of the concentric sections being inferior to the diameter of the corresponding pipes by a ratio comprised between 5 and 10%.

The deformable portion of the bellows comprises an inwardly bent section.

The deformable portion and the frame of the bellows comprise complementary male and female shapes adapted to prevent relative displacements of the deformable portion with respect to the frame in a radial direction relative to a central axis of the bellows.

The complementary male and female shapes comprise protruding elements extending along an axial direction, provided on a flat radial portion of the deformable portion, and recesses provided in the frame.

The invention also concerns an air handling unit comprising at least one panel crossed by a pipe, and in which the pipe is attached and tightly passed through the panel using a fastening system as mentioned here-above.

According to a further aspect of the invention, the pipe is provided for circulation of a heat transfer fluid in a heat exchanger of the air handling unit, and is adapted to be connected to an exterior heat transfer fluid feeding pipe.

The invention will now be explained with reference to the annexed drawings, as an illustrative example. In the annexed drawings.

Figure 1:
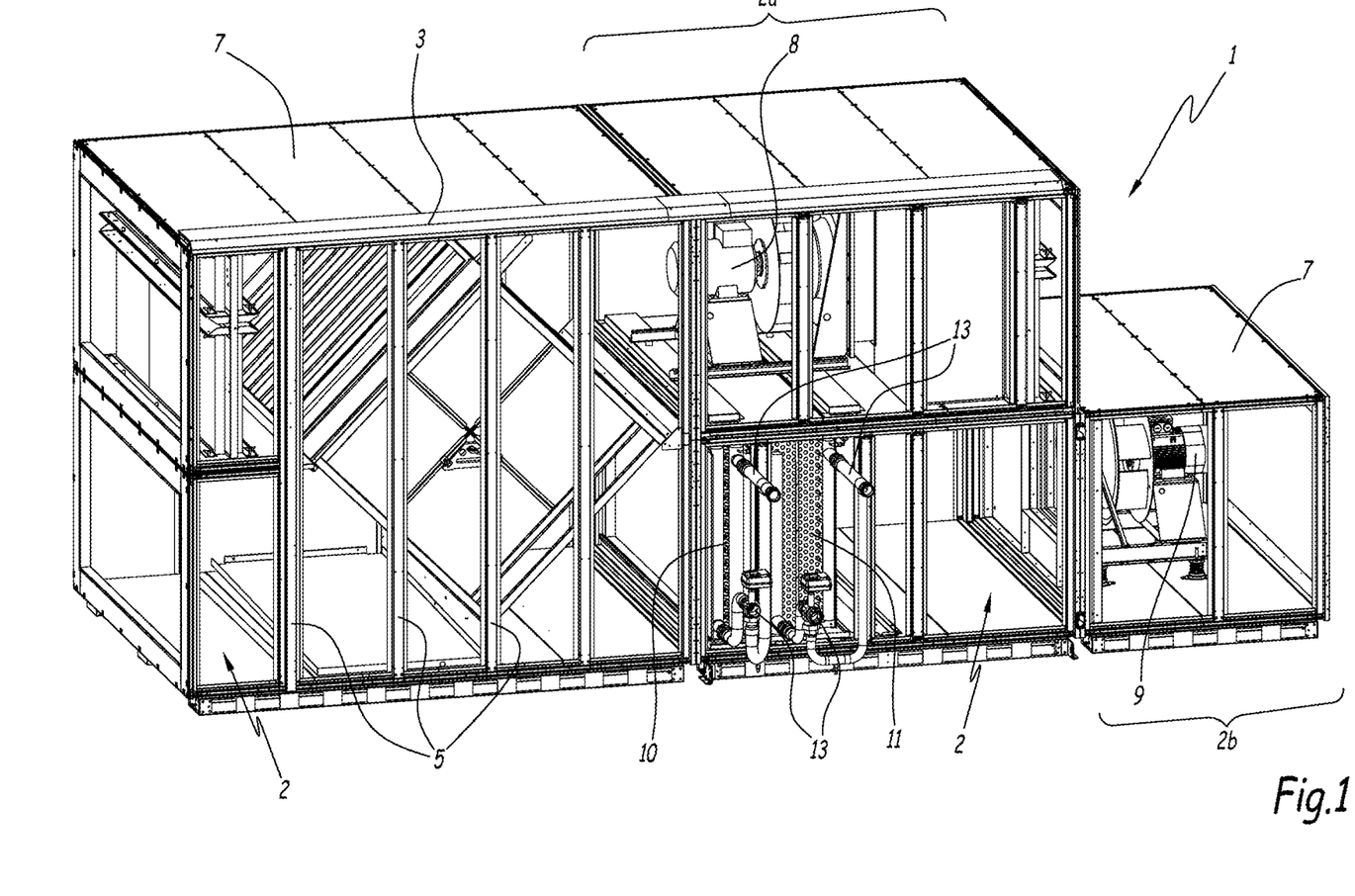
FIG. 1 is a perspective view of an air handling unit according to the invention.

FIG. 1 shows an air handling unit 1 which comprises a plurality of modules 2 and a plurality of components. Each module 2 comprises a structural frame formed by horizontal bars 3 and vertical bars 5. The horizontal and vertical bars 3 and 5 support a housing made of flat insulating panels 7, some of these panels 7 being represented on FIG. 1 on top surfaces of the air handling unit 1.

Each module 2 of the air handling unit 1 includes at least one component, of which some of them are represented on FIG. 1. Two ventilators 8 and 9 equipped with motors are represented in modules 2a and 2b.

The components of the air handling unit 1 can be, for example a ventilation device, a heater, a cooler, filters, registers with mobile vanes, a heat recovery device, a humidifier. In the unit of FIG. 1, are represented two heat exchangers 10 and 11, which may be coolers or heaters. In these heat exchangers 10 and 11, a heat transfer fluid is circulated. This heat transfer fluid can be water or a gas. These heat exchangers 10 and 11 have to be fed with heat transfer fluid from outside of the air handling unit 1. The heat transfer fluid is provided from non-shown dedicated systems adapted to produce either heated transfer fluid, such as hot water, or cold heat transfer fluid, such as refrigerating gas.

In order to feed the heat exchangers 10 and 11 with the heat transfer fluid, fluid pipes for the inlet and outlet of the heat transfer fluid are provided, connected to the heat exchangers 10 and 11 and protruding through the insulating panels 7 outside of the unit 1, so that they can be connected to heat or cold production systems, or to other pipes connected to heat or cold production systems.

In FIG. 1 are represented four pipes 13 which pass through a non-shown side insulating panel of the unit 1.

Figure 2:
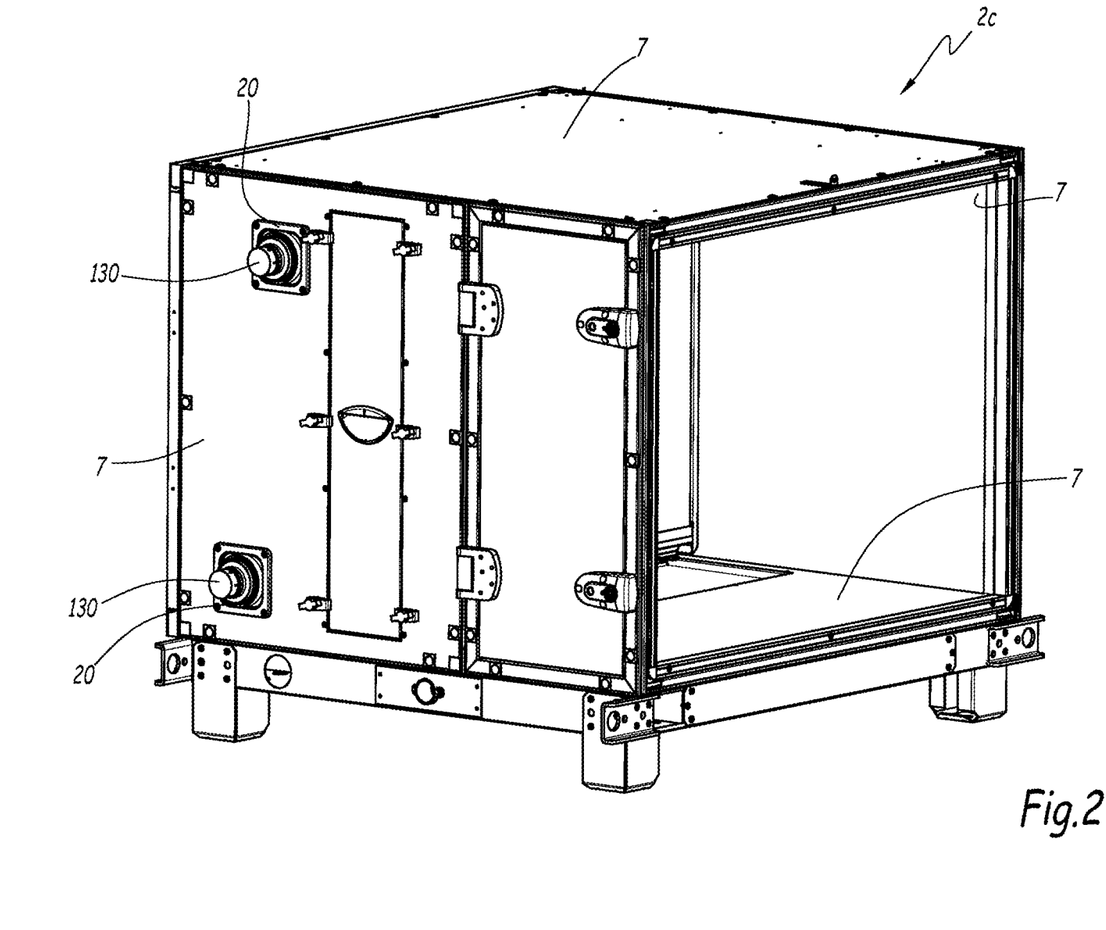
FIG. 2 is a perspective view of a module of the air handling unit of FIG. 1, showing a lateral insulating panel and fastening systems according to the invention.

As it is more precisely shown in FIG. 2, in which a module 2c of the air handling unit 1 is represented, the pipes are passed through the panel 7 using fastening systems 20, which provide mechanical support of the pipes in holes of the panel 7, and guarantee air tightness of the air handling unit 1. On FIG. 2, two fastening systems 20 are provided for fastening an inlet pipe and an outlet pipe which are represented by respective covering stoppers 130, which are placed on the ends of the pipes when the pipes are not connected to any cold or hot transfer fluid production system.

Figure 6:
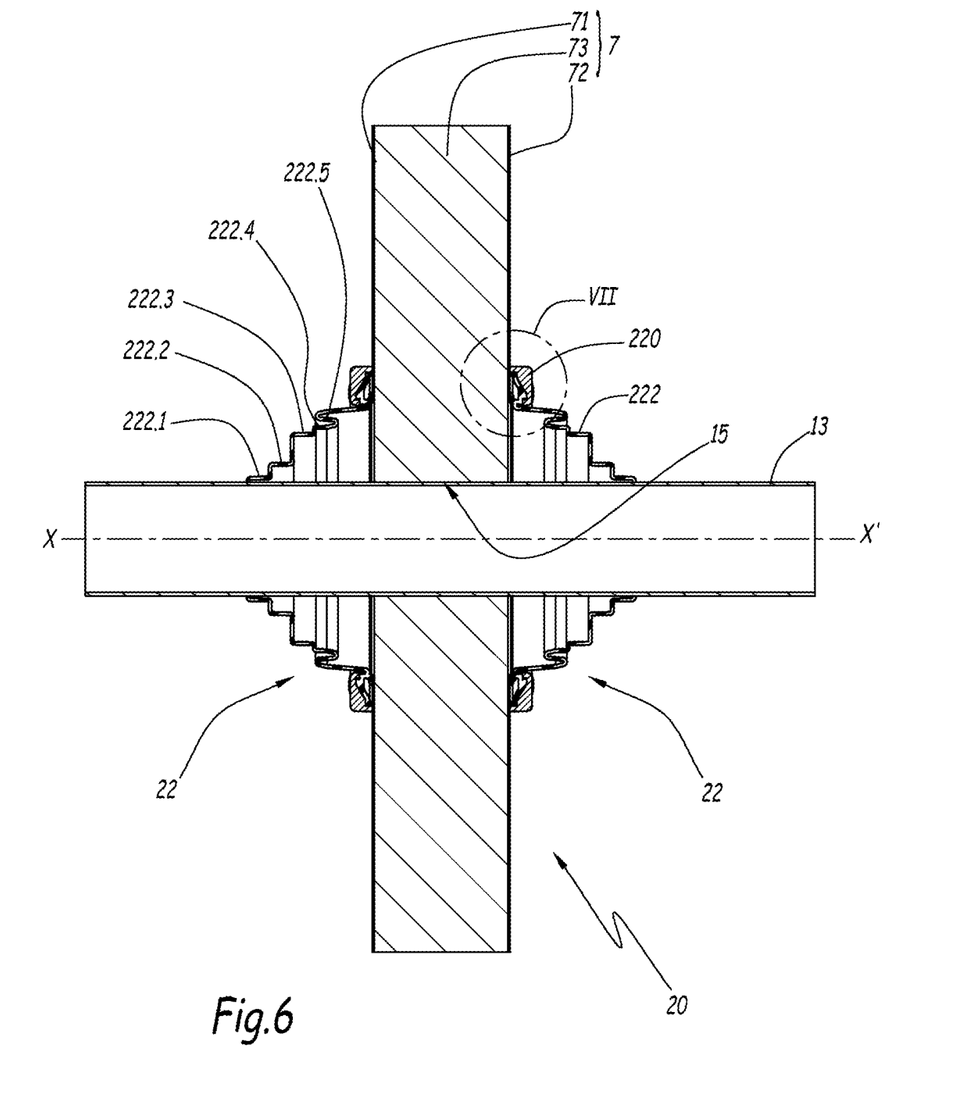
FIG. 6 is a sectional view of the fastening system of FIGS. 3 and 4, of an insulating panel and a fluid pipe.

As it is represented more precisely in FIG. 6, each panel 7 comprises two parallel walls 71 and 72, which are separated by a layer 73 of insulating material. One of walls 71 and 72 is oriented towards the interior of the air handling unit 1, while the other one of walls 71 and 72 is oriented towards the outside of the air handling unit 1. The pipe 13 is passed through the panel 7 through a hole 15. The fastening system 20 comprising two bellows 22 fixed on each of the interior side of the panel 7 and the exterior side of the panel 7. As shown in FIG. 6, one bellow 22 is fixed on the wall 71, while a second bellow 22 is fixed on the wall 72.

The pipe 13 defines a central axis X-X' perpendicular to the panel 7. The central axis X-X' also denotes a central axis of the hole 15 and of the bellows 22. In this description, the terms "axial" or "radial", "radially" or "axially" are used in reference to central axis X-X'.

Each bellow 22 comprises a frame 220 fixed on one of the walls 71 and 72, and a deformable portion 222, which is fixed to the frame 220. The deformable portion 222 comprises a wide portion 222a, which connects the deformable portion 222 to the frame 220, and a narrow portion 222b which is elastically fitted around the pipe 13. The deformable portion 222 is made of a plastic material, such as PA6 with glass fibers.

Figure 7:
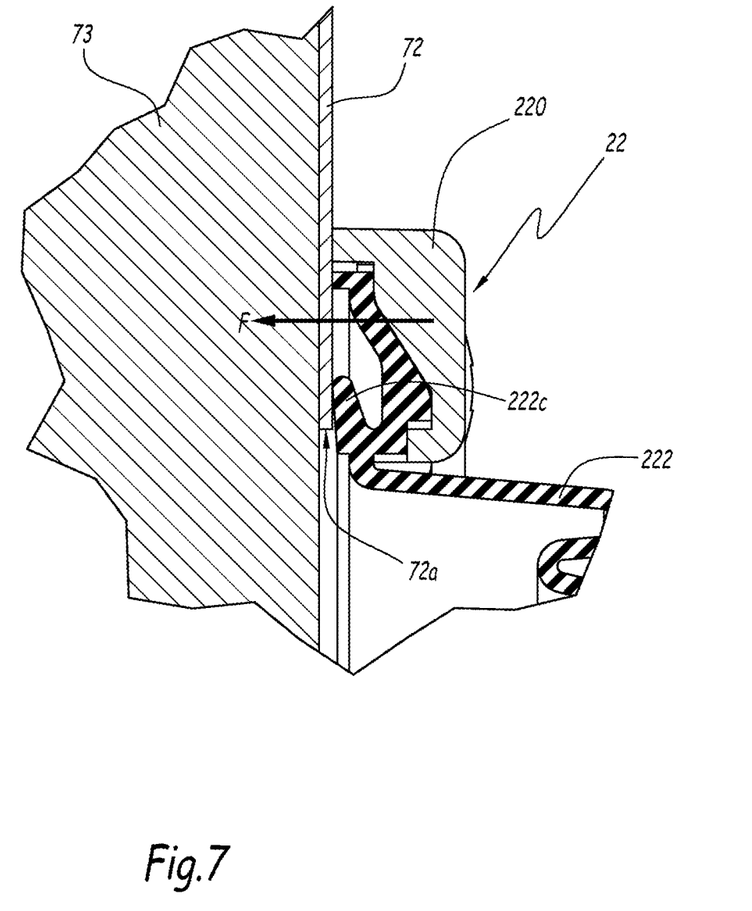
FIG. 7 is a sectional view, at a larger scale, of detail VII on FIG. 6.

The deformable portion 222 comprises a sealing lip 222c which contacts the wall against which the bellow 22 is fixed. The sealing lip 222c is shown in FIG. 7 and forms a continuous sealing around a hole 72a provided on the wall 72 of the panel 7 and which is comprised in the hole 15 formed in the panel 7.

Figure 5:
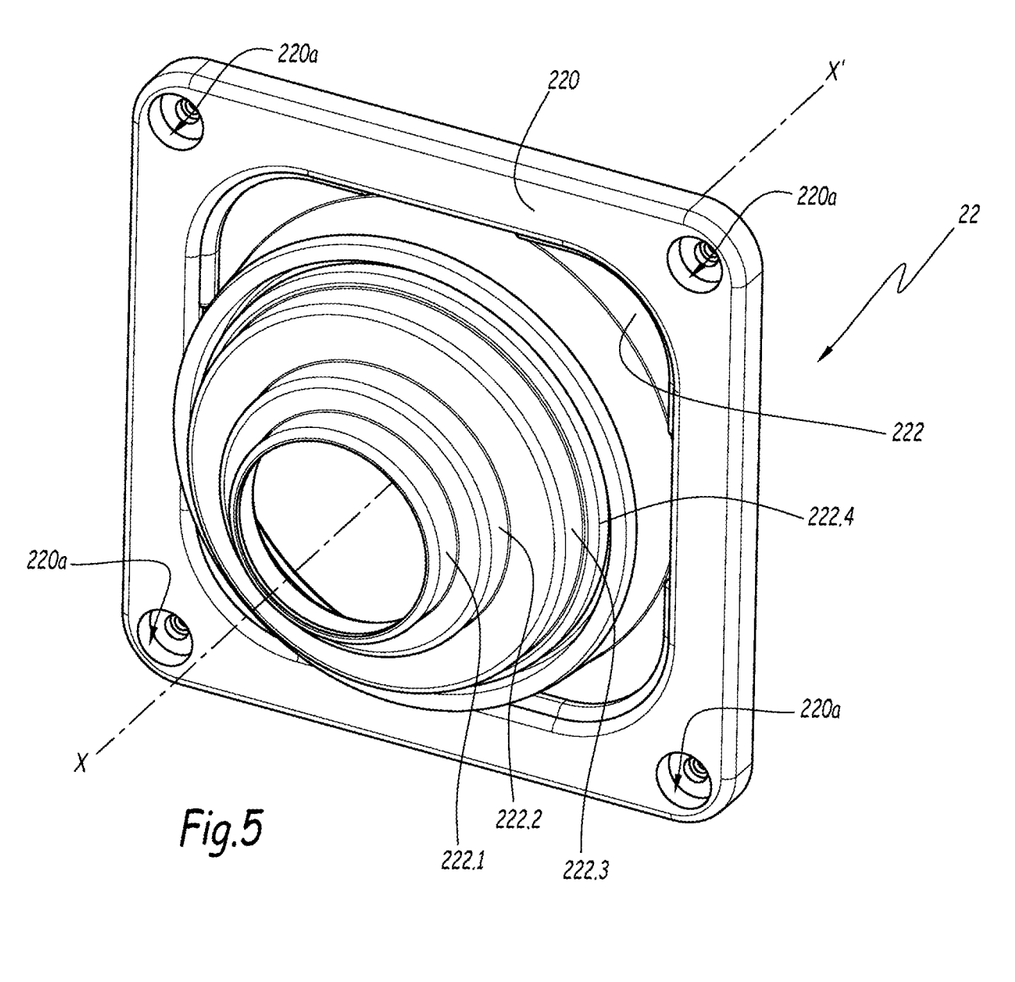
FIG. 5 is a perspective view of a bellow of the fastening system of FIGS. 3 and 4.

In a non-shown unstressed state, for example when the bellow 22 is not mounted on a panel 7, the sealing lip 222c is not deformed and extends substantially along an inclined direction with respect to the central axis X-X'. In the mounted state represented on FIG. 5, the frame 220 exerts a force, shown by arrow F on FIG. 7, perpendicular to the wall 72 on the deformable portion 222 which tends to compress the lip 222c against the wall 72. This guarantees the air tightness of the unit 1 by preventing air flowing in the interior side of the unit 1 from getting out through the interface between the wall 72 and the bellow 22.

The bellows 22 are fixed on the walls 71 and 72 by screws 24 which pass through holes 220a of the frame 220 and through holes 222d1 of a radial flat portion 222d of the deformable portion 222.

Figure 3:
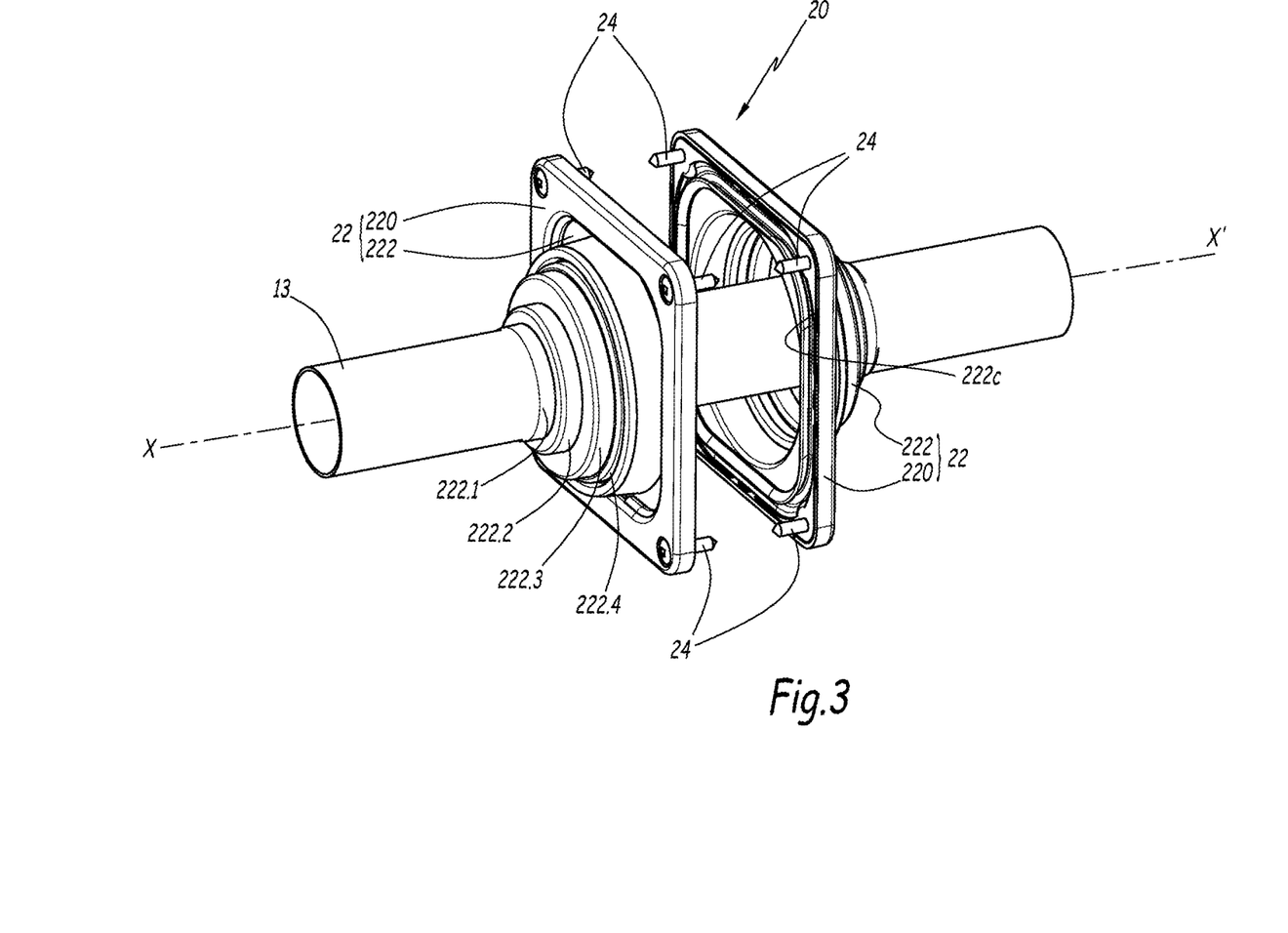
FIG. 3 is a sectional view of the fastening system of FIG. 2 and a fluid pipe.

The deformable portion 222 comprises concentric sections 222-1 to 222-5 centered on the axis X-X' and adapted to be cut according to several different diameters of pipes. The diameters of the concentric sections 222-1 to 222-5 are increasing towards the frame 220. The respective diameters of the concentric sections 222-1 to 222-5 are inferior to the diameters of the corresponding pipes by a ratio comprised between 5 and 10%. As shown in FIGS. 3 and 6, the section 222-1, which has the lowest diameter, is fitted to the pipe 13.

According to an optional feature, the deformable portion 222 comprises an inwardly bent section 222-5, which can be seen in FIG. 6, and which improves the axial compactness of the system 20. In other words, instead of extending away from the frame 220, the section 222-5 extends towards the frame 220.

Figure 4:
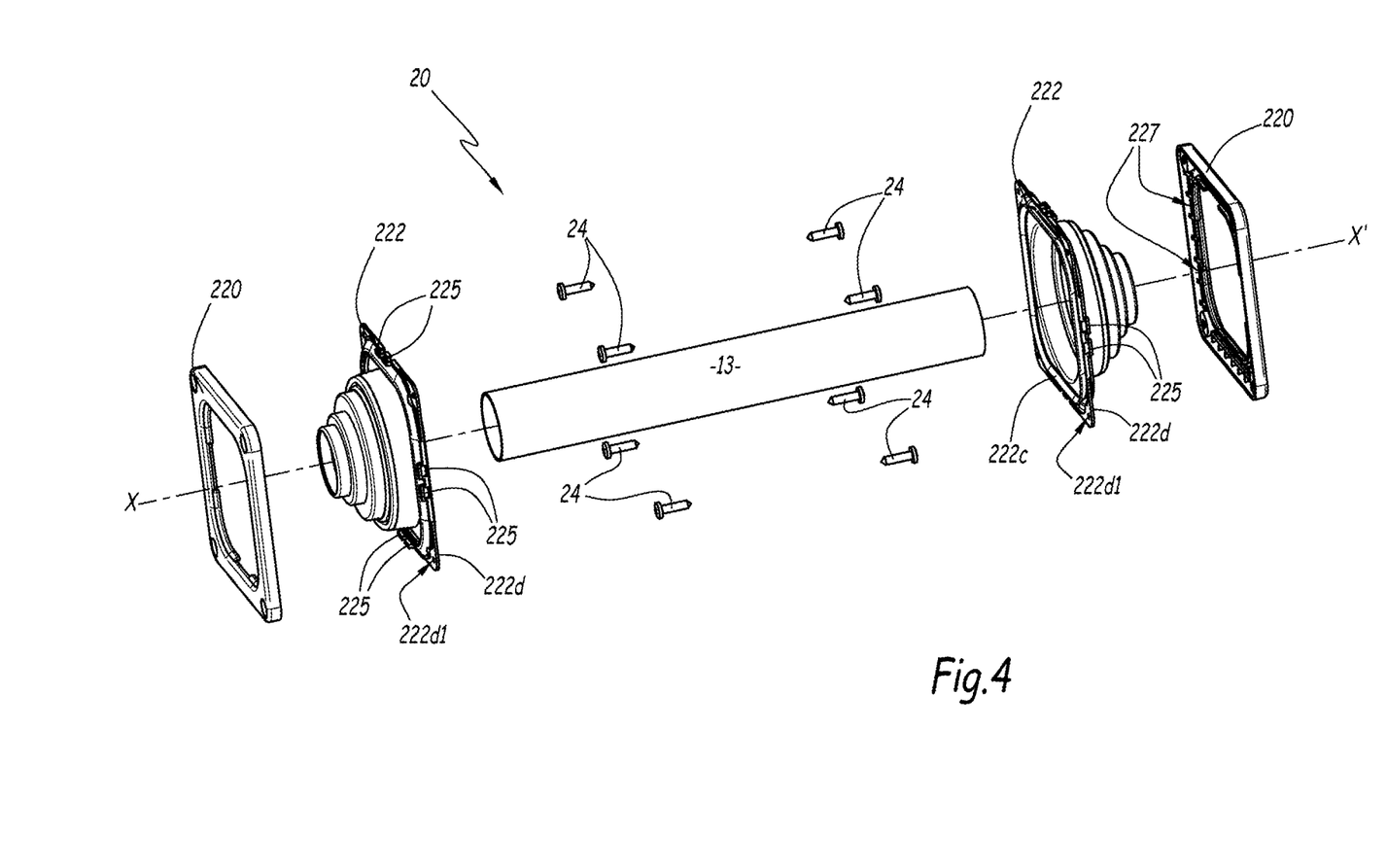
FIG. 4 is an exploded perspective view of the fastening system and the fluid pipe of FIG. 3.

According to an optional feature represented on FIG. 4, the deformable portion 222 and the frame 220 comprise complementary male and female shapes adapted to prevent relative displacements of the deformable portion 222 with respect to the frame 220, radially to axis X-X'. The complementary male and female shapes comprise protruding elements 225 extending parallel to axis X-X', provided on the flat radial portion 222d. The complementary female shapes are provided in the frame 220 in the form of recesses 227.

The invention claimed is:

1. Fastening system for a pipe passing through an insulating side panel of an air handling unit, said panel comprising two parallel walls separated by a layer of insulating material, and a hole provided through the walls and the layer of insulating material for passing the pipe, wherein the fastening system comprises:

two bellows, one for being fixed on each of the parallel walls of the panel around the hole, each bellow comprising a frame for being fixed on one of the walls and a deformable portion fixed to the frame, the deformable portion comprising a wide portion which connects the deformable portion to the frame, and a narrow portion fitted around the pipe;

wherein the wide portion of each bellow comprises a sealing surface for contacting the wall against which the bellow is to be fixed; and wherein the deformable portion of each bellow comprises a sealing lip disposed radially inward of the sealing surface of the wide portion and for contacting the wall against which the bellow is to be fixed;

wherein the frame of each bellow extends beyond the outer circumference of the wide portion of the deformable portion of each bellow.

2. Fastening system according to claim 1, wherein the sealing lip defines a continuous sealing around the hole provided on the panel.

3. Fastening system according to claim 2, wherein the frame exerts a force on the deformable portion which tends to compress the sealing lip against the wall.

4. Fastening system according to claim 1, wherein the deformable portion of the bellows is made of a plastic material.

5. Fastening system according to claim 4, wherein the deformable portion of the bellows is made of PA6 with glass fibers.

6. Fastening system according to claim 1, wherein the bellows are fixed on the walls by screws which pass through the frame and through holes of a radial flat portion of the deformable portion.

7. Fastening system according to claim 1, wherein the deformable portion of the bellows comprises concentric sections adapted to be cut according to several different diameters of pipes, the respective diameters of the concentric sections being inferior to the diameter of the corresponding pipes by a ratio comprised between 5 and 10%.

8. Fastening system according to claim 1, wherein the deformable portion of the bellows comprises an inwardly bent section.

9. Fastening system according to claim 1, wherein the deformable portion and the frame of the bellows comprise complementary male and female shapes adapted to prevent relative displacements of the deformable portion with respect to the frame in a radial direction relative to a central axis of the bellows.

10. Fastening system according to claim 9, wherein the complementary male and female shapes comprise protruding elements extending along an axial direction, provided on a flat radial portion of the deformable portion, and recesses provided in the frame.

11. Air handling unit comprising at least one panel crossed by a pipe, wherein the pipe is attached and tightly passed through the panel using a fastening system according to claim 1.

12. Air handling unit according to claim 11, wherein the pipe is provided for circulation of a heat transfer fluid in a heat exchanger of the air handling unit, and is adapted to be connected to an exterior heat transfer fluid feeding pipe.

* * * * *